Feb. 24, 1942.  F. ALTMAYER  2,274,118
BATTERY FILLER
Filed Oct. 5, 1939  2 Sheets-Sheet 1

INVENTOR.
FRANK ALTMAYER
BY Kwis Hudson Kent
ATTORNEYS

Feb. 24, 1942. F. ALTMAYER 2,274,118
BATTERY FILLER
Filed Oct. 5, 1939 2 Sheets-Sheet 2
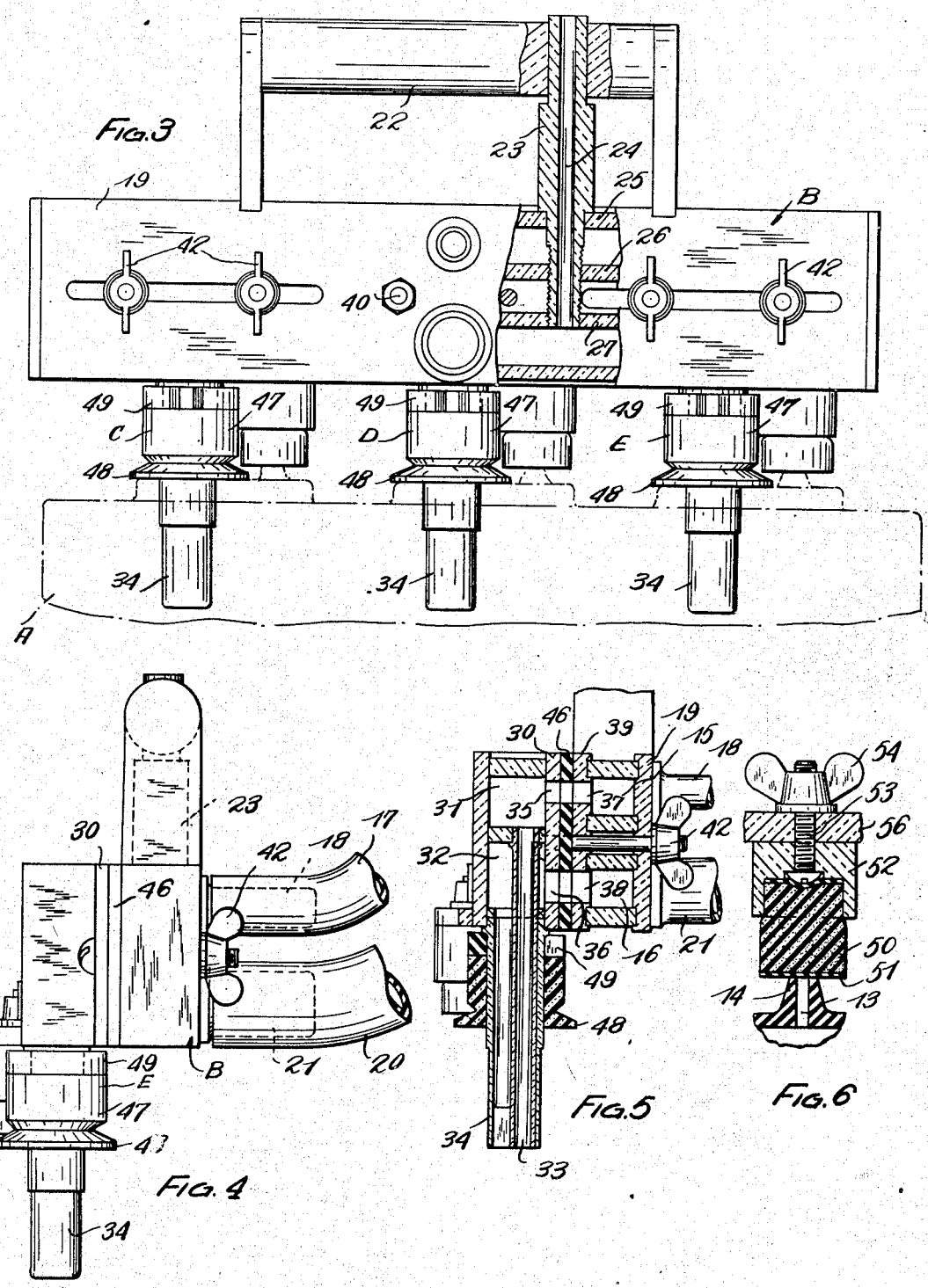
INVENTOR.
FRANK ALTMAYER
BY Kwis Hudson & Kent
ATTORNEYS Patented Feb. 24, 1942

2,274,118

UNITED STATES PATENT OFFICE 2,274,118

BATTERY FILLER

Frank Altmayer, Cleveland, Ohio, assignor to Willard Storage Battery Company, Cleveland, Ohio, a corporation of West Virginia Application October 5, 1939, Serial No. 298,120

8 Claims. (Cl. 226—19)

The present invention relates to improvements in battery filling systems such as used in filling batteries of the lead-acid type with electrolyte and more particularly to improvements in the construction of a battery filler head set to be used with a vacuum filling system.

The ordinary vacuum filling system comprises a vacuum cup, a reservoir containing liquid, such as electrolyte, an overflow collection jar set, a filler head set, and the necessary flexible tubing connecting the various units of the system in a manner well known in the art.

The object of the present invention is the provision of a novel improved filler head set for use in a system of the character referred to above which is adjustable for different size batteries and different type cell covers.

The present invention resides in certain details of construction and combinations and arrangements of parts and further objects and advantages of the invention will be apparent to those skilled in the art to which the invention relates from the following description of the preferred embodiment thereof described with reference to the accompanying drawings forming a part of the specification in which similar reference characters designate corresponding parts, and in which Fig. 1 is a front elevational view of a battery filler head embodying the present invention in position upon a battery shown in section on the center line of the filler holes and comprising new type cell covers having the vent openings for the cells in bosses located to one side of and in front of the bosses having the filling holes therein;

Fig. 3 is a rear elevational view of the filler head shown in the preceding figures with portions in section;

Fig. 4 is an end view of the filler head shown in the preceding figures;

Fig. 5 is a section on the line 5—5 of Fig. 1; and

Fig. 6 is a section on the line 6—6 of Fig. 1.

Figure 1:
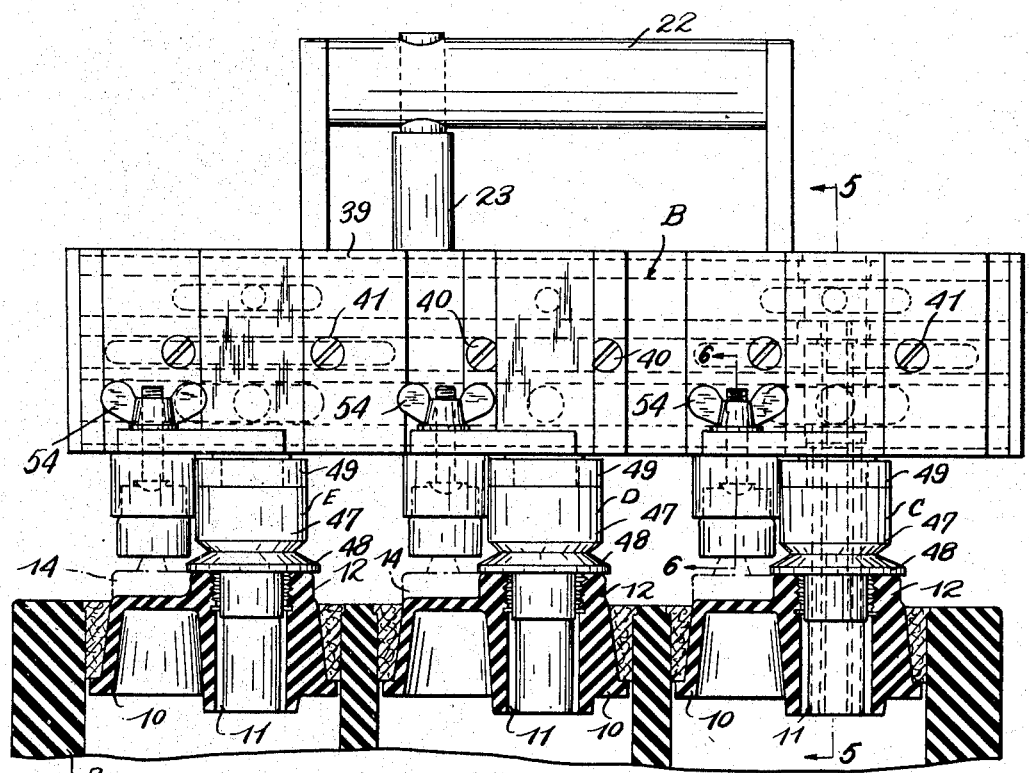
Figure 2:
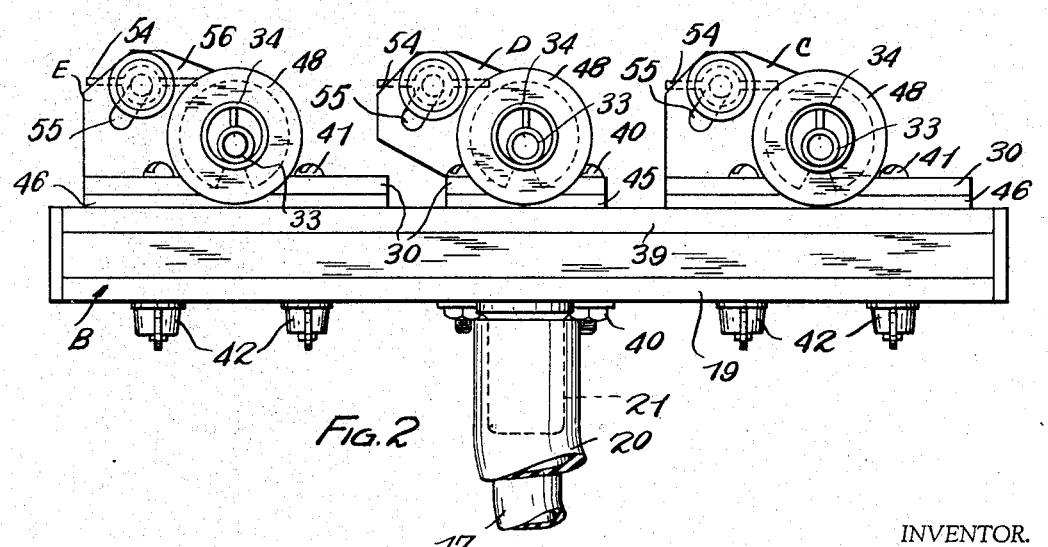
Fig. 2 is a bottom view of the filler head shown in Fig. 1.

Referring to the drawings, Fig. 1 shows a filler head embodying the present invention in position upon a battery of the lead-acid type, designated generally by the reference character A, and comprising cell covers 10. The battery is shown in section on the center line of the filler hole openings 11 surrounded by bosses 12. The vent openings 13 for the cells, see Fig. 6, are formed in bosses 14 shown in dot-dash lines in Fig. 1. As viewed in this figure the bosses 14 are located at one side of and in front of the bosses 12 surrounding the filling holes 11. The filling holes 11 are internally threaded for the reception of suitable caps to close the same in a manner well known in the art.

The filler head member or frame comprises a body portion B and a plurality of nozzle assemblies, in the present instance three, designated C, D and E, detachably secured to the body portion B. The body portion B is preferably built up of transparent sheet material, such as Celluloid, and has two chambers 15 and 16 one located above the other. The upper chamber 15 is adapted to be connected to the vacuum pump through the overflow collecting jar set, neither of which is shown, by flexible tubing 17 connected to a nipple 18 secured to and projecting from the rear side or plate 19 of the body portion of the filler head. The lower chamber 16 is adapted to be connected to a liquid reservoir, not shown, by flexible tubing 20 connected to a nipple 21 also secured to and projecting from the rear side of the body portion of the filler head below the nipple 18.

The body portion of the filler head is provided with a handle, designated generally by the reference character 22, to facilitate manipulation thereof. The handle 22 is provided with a vent opening communicating with the liquid chamber 16 in the form of a tubular member 23 having a bore 24 extending therethrough, the upper reduced end of which tubular member extends through the handle 22 while the lower reduced end thereof extends through the top plate 25 of the body portion B, the chamber 15, and the partitions 26 and 27 forming the bottom and top walls of the chambers 15 and 16, respectively. The tubular member 23 has threaded engagement with the partitions 26 and 27 which prevents leakage of air or liquid therethrough. The construction is such that the bore 24 of the member 23 can be readily closed by the operator by merely placing his thumb over the same.

Communication is adapted to be established between the chambers 15 and 16 and the interior of the battery by the nozzle assemblies C, D and E which are adjustable relative to each other to accommodate different size batteries, thus avoiding the necessity of having a different filler head for each size of battery passing the filling machine.

The preferred embodiment of the invention shown in the drawings is especially adapted for filling batteries having three cells and the central nozzle assembly D is fixed relative to the body portion of the filler head while the end nozzle assemblies C and E are adjustable relative thereto. The nozzle assemblies are preferably made of built-up material similar to the body portion. Each nozzle assembly includes a sheet or member 30 through the medium of which the nozzle assembly is secured to the body portion and has upper and lower chambers 31 and 32, respectively, adapted to be connected to or to communicate with the inside of the battery cell through the medium of tubes or nozzles 33 and 34 one within the other. The inner tube 33 communicates with the upper chamber 31 and the outer tube 34 wtih the lower chamber 32. When the nozzle assemblies are assembled with the body portion, the chambers 31 and 32 are connected to the chambers 15 and 16, respectively, of the body portion B by suitable apertures 35 and 36 in the member 30 which align with suitable apertures 37 and 38 in the front sheet or member 39 of the body portion. The end apertures 37 and 38 are elongated so as to permit adjustment of the end nozzle assemblies C and E.

The central nozzle assembly D is secured in fixed relation to the body portion B of the filler head by a plurality of bolts 40 and the end nozzle assemblies C and E are adjustably secured to the body portion B by bolts 41. The bolts 40 and 41 project through suitable openings in the body portion B between the upper and lower chambers 15 and 16 and the bolts 41 are provided with wing nuts 42 at the rear of the body portion to facilitate loosening thereof for adjusting the nozzle assemblies. Suitable gaskets 45 and 46 made of rubber or the like are positioned between the rear members 30 of the nozzle assemblies and the front member 39 of the body portion of the filler head to prevent leakage of the electrolyte or liquid, as the case may be.

The tubes 33 and 34 are of sufficient length to project down into the battery cells to the point where the top of the electrolyte or maximum filling height is intended to be. The outer tubes 34 are provided with filling opening seals 47 preferably made of gum rubber and comprising a collar provided with a thin flexible skirt or flange 48 extending outwardly and downwardly and of sufficient diameter to close the filling opening through which the respective nozzles project when the filler head is in position on the battery. The seals 47 are held in position on the tubes 34 by their snug flexible fit and are slidable therealong for adjustment purposes. Because of the flexibility of their circularly shaped flanges 48, the seals 47 make a yielding contact with the top of the bosses 12 surrounding the filling openings and any unevenness of the covers, etc., does not affect the closing of the filling openings. The seals are also effected without the application of pressure because the vacuum subsequently produced in the cells pulls the seals down into tight contact with the upper edge of the bosses 12. In addition to closing the filling openings the seals 47 determine the vertical position of the filler headset upon the battery and in turn the level to which the cells are filled. Adjustment washers 49 of horseshoe design are provided above the seals 47 for positively limiting their vertical movement along the nozzles in an upward direction so that the seals can be positively adjusted to fill the cells to the correct level. The cells can be filled to different levels by substituting larger or smaller washers, etc.

In operation, the vacuum pump withdraws air from the upper chambers 15 and 31, thus producing a vacuum in the battery cells. When the vent opening 24 in the tubular member 23 is closed by the operator placing his thumb over the same, liquid or electrolyte is drawn from the liquid reservoir into the lower chambers 16 and 32 and in turn into the battery cells. When the height of the liquid in the cells reaches the lower ends of the stems or tubes 33 and 34, it can rise no farther as continued filling results in the excess liquid being drawn off into the overflow collecting jar set. When the operator observes that the cells are full, he removes his thumb from the opening 24 thereby breaking the vacuum in the cells and stopping the flow of liquid from the reservoir. Part of the liquid remaining in the lower chambers 16 and 32 at the time the vacuum is broken is syphoned back into the reservoir and the remainder flows into the cells where it is drawn up to the overflow jar set, and the filler head set may be removed from the battery without dripping.

With batteries having cell covers of the type herein illustrated where a separate vent opening is provided at one side of the filling opening, it is necessary to close the vent opening before the battery can be filled. According to the provisions of the present invention, this is accomplished by cylindrically shaped, sponge rubber members 50, see Fig. 6, one for each of the vent openings. The sponge rubber members 50 illustrated have an impervious soft rubber sheet 51 on their lower ends which seals the vent holes 13 in the battery cell covers. The upper ends of the soft rubber members 50 are secured in Celluloid cups 52 fixed to the nozzle assemblies through the medium of bolts provided with wing nuts 54 which bolts project through elongated slots 55 in horizontal members 56 of the nozzle assemblies. The elongated slots 55 permit horizontal adjustment of the members 50 where necessary.

In the preferred embodiment of the invention herein illustrated and described, the seals 47 constitute the means for determining the vertical position of the filler head set upon the battery and in turn the level to which the cells are filled, but it is to be understood that if desired the means for sealing the vent openings 13, which means comprises the sponge rubber members 50, may be employed to determine the vertical position of the filler head relative to the battery, or both the seals 47 and the members 50 may be employed to perform this function. In this event the cylindrical members 50 are preferably made of more rigid material than sponge rubber but of material which has sufficient flexibility to assure that the vent openings are sealed and to compensate for slight irregularities in the covers. Different length cylinders may be employed to obtain different liquid heights and when used with batteries having the old type cover, that is covers not having vent openings separate and apart from the filling openings, the lower end of the members merely rest upon the cell covers.

As previously stated, the various parts of the body and nozzle assemblies are preferably made of transparent material such as Celluloid, thus permitting the operator to observe the filling operation and to quickly locate any obstructions in the different chambers, etc. The body portion and the nozzle assemblies are also preferably made of preformed members fastened together in a suitable manner. This minimizes the possibility of cracks, etc. The filler head set herein shown and described is adapted for use with a three-cell battery but it is to be understood that the present invention is applicable to filler head sets for use with batteries having any number of cells.

From the foregoing description of the preferred embodiment of the invention, it will be apparent that the objects of the invention heretofore enumerated have been accomplished and that a filler head set has been provided which will perfectly fill a battery in a single operation irrespective of the type of cell cover or the spacing of the filling openings, etc. While the invention has been described in considerable detail, I do not wish to be limited to the particular construction shown which may be varied within the scope of this invention and it is my intention to cover hereby all adaptations, modifications and arrangements thereof which come within the practice of those skilled in the art to which the invention relates, and I particularly point out and claim as my invention the following.

Having thus described my invention what I claim is:

1. A multi-cell battery filling head comprising a frame including a handle and having a plurality of chambers therein, means for connecting one of said chambers to a vacuum, means for connecting another of said chambers with a liquid supply, said frame comprising nozzles adapted to be projected through the filler openings of the cells of the battery and having a plurality of passageways therethrough communicating with said chambers, resilient seals carried by said nozzle adapted to close said filler openings and support said frame on the battery to be filled, and resilient means separate from said seals for supporting said frame on the battery to be filled, said frame having a vent opening adjacent to said handle communicating with one of said chambers.

2. A multi-cell battery filling head comprising a frame including a handle and having a plurality of chambers therein, means for connecting one of said chambers to a vacuum, means for connecting another of said chambers with a liquid supply, a plurality of nozzle assemblies connected to said frame, each of said nozzle assemblies comprising a nozzle adapted to be projected through the filler opening of one of the cells of the battery and having a plurality of passageways therethrough communicating with said chambers, means for adjusting said nozzle assemblies relatively towards and from each other, and resilient seals carried by said nozzles for closing said filler opening and for supporting said frame on the battery to be filled, said frame having a vent opening adjacent said handle communicating with one of said chambers.

3. In a device for filling multi-cell batteries having separate filler openings and vent openings, the combination of a frame or member having a plurality of chambers therein, means for connecting one of said chambers with a vacuum, means for connecting another of said chambers with a liquid supply, said frame comprising nozzles adapted to be inserted into the battery cells through the filler openings and having a plurality of passageways therein communicating with said chambers, resilient seals carried by said nozzles adapted to close said filler openings, and resilient means carried by said frame for closing the vent openings of the battery cells.

4. In a device for filling multi-cell batteries having separate filler openings and vent openings, the combination of a frame comprising a handle and having a plurality of chambers therein, means for connecting one of said chambers with a vacuum, means for connecting another of said chambers with a liquid supply, said frame comprising nozzles adapted to be inserted into the battery cells through the filler openings and having a plurality of passageways therein communicating with said chambers, resilient seals carried by said nozzles adapted to close said filler openings, and resilient means carried by said frame adapted to close the vent openings of the battery cells and support said frame on the battery.

5. In a device for filling multi-cell batteries having separate filler openings and vent openings, the combination of a frame comprising a handle and having a plurality of chambers therein, means for connecting one of said chambers with a vacuum, means for connecting another of said chambers with a liquid supply, said frame comprising nozzles adapted to be inserted into the battery cells through the filler openings and having a plurality of passageways therein communicating with said chambers, resilient seals carried by said nozzles adapted to close said filler openings, and resilient means carried by said frame adapted to close the vent openings of the battery cells, said frame having a vent opening adjacent said handle communicating with one of said chambers.

6. In a device for filling multi-cell batteries having separate filler openings and vent openings, the combination of a frame or member having a plurality of chambers therein, means for connecting one of said chambers with a vacuum, means for connecting another of said chambers with a liquid supply, a plurality of nozzle assemblies connected to said frame, each of said nozzle assemblies comprising a nozzle adapted to be inserted into a cell of the battery, each of said nozzles having a plurality of passageways therein communicating with said chambers, resilient seals carried by said nozzles adapted to close said filler openings, and resilient means carried by said frame for closing the vent openings of the battery cells.

7. In a device for filling multi-cell batteries having separate filler openings and vent openings, the combination of a frame having a plurality of chambers therein, means for connecting one of said chambers with a vacuum, means for connecting another of said chambers with a liquid supply, a plurality of nozzle assemblies connected to said frame, each of said nozzle assemblies comprising a nozzle adapted to be inserted into a cell of the battery, each of said nozzles having a plurality of passageways therein communicating with said chambers, means for adjusting said nozzle assemblies relatively towards and from each other, resilient seals carried by said nozzles adapted to close said filler openings, members carried by said frame adapted to close the vent openings of the battery, and means for adjusting said members relative to said nozzles.

8. In a device for filling multi-cell batteries having separate filler openings and vent openings, the combination of a frame comprising a handle and having a plurality of chambers therein, means for connecting one of said chambers with a vacuum, means for connecting another of said chambers with a liquid supply, a plurality of nozzle assemblies connected to said frame, each of said nozzle assemblies comprising a nozzle adapted to be inserted into a cell of the battery, each of said nozzles having a plurality of passageways therein communicating with said chambers, means for adjusting said nozzle assemblies relatively towards and from each other, resilient seals carried by said nozzles adapted to close said filler openings, resilient members carried by said frame adapted to close the vent openings of the battery, and means for adjusting said members relative to said nozzles, said frame having a vent opening adjacent said handle and communicating with one of said chambers.

FRANK ALTMAYER.